United States Patent [19]

Desroches

[11] Patent Number: 5,559,441
[45] Date of Patent: Sep. 24, 1996

[54] TRANSMISSION LINE DRIVER WITH SELF ADJUSTING OUTPUT IMPEDANCE

[75] Inventor: Alan R. Desroches, San Jose, Calif.

[73] Assignee: Hewlett-Packard Company, Palo Alto, Calif.

[21] Appl. No.: 424,935

[22] Filed: Apr. 19, 1995

[51] Int. Cl.[6] .................................................. G01R 31/08
[52] U.S. Cl. ........................................... 324/647; 324/607
[58] Field of Search ..................................... 324/642, 647, 324/607, 533, 534, 648, 646, 725; 379/26; 343/850; 370/13

[56] References Cited

U.S. PATENT DOCUMENTS

| 4,484,131 | 11/1984 | Jenkinson | 324/646 |
| 4,970,466 | 11/1990 | Bolles et al. | 324/533 |

OTHER PUBLICATIONS

André DeHon et al., "Automatic Impedance Control", IEEE International Solid–State Circuits Conference, 1993, pp. 164, 165 and 283.

Primary Examiner—Michael Tokar

[57] ABSTRACT

A flexible and efficient integrated circuit chip that includes pad drivers for driving an impedance of a transmission line, wherein the integrated circuit further includes all additional circuitry to automatically adjust a matching impedance of the pad drivers. The integrated circuit chip includes a set of selectively activatable pad drivers and a counter coupled with the drivers for selectively activating an initial number of members of the set of the pad drivers to drive the transmission line with a test pulse. The integrated circuit chip further includes a comparator having a first input for sensing a voltage amplitude of the test pulse and a second input coupled with a voltage reference for comparing the voltage amplitude of the test pulse with the reference voltage. An output of the comparator is coupled with the counter for increasing the counter's initial number of selected members of the set of the pad drivers if the voltage amplitude of the test pulse is less than the reference voltage. Such iterative capabilities of the invention provide an automatic optimal selection of the pad drivers, so that the parallel impedance of the activated drivers provides a good match with the impedance of the transmission line.

6 Claims, 8 Drawing Sheets

TRANSMISSION LINE DRIVER WITH SELF ADJUSTING OUTPUT IMPEDANCE

FIELD OF THE INVENTION

The invention relates to integrated circuits and more particularly to pad drivers of an integrated circuit.

BACKGROUND OF THE INVENTION

As technology advances, high speed integrated circuits chips (IC's) operating at ultra-high or microwave frequencies are adopted in an increasing number of applications. For IC packages, printed circuit board (PCB) assemblies or multi-chip module (MCM)assemblies incorporating such high speed integrated circuit chips, signal leads and interconnecting traces of the packages and assemblies are properly considered to be transmission lines, rather than simply modeled as lumped capacitors. Each high speed integrated circuit chip includes pad driver circuitry for driving these transmission lines.

To avoid impedance mis-match and signal reflections, transmission lines should be terminated with resistance substantially equal to a characteristic impedance ($Z_0$) of the transmission line. A transmission line can be terminated at either end or both ends of the transmission line. A termination method that results in lowest power dissipation includes terminating an input end of the transmission line, otherwise known as a source termination method. Accordingly, in a high speed integrated circuit chip application, it is preferred that an output impedance of the pad driver is substantially equal to the characteristic impedance of the transmission line.

A difficulty in previously known pad drivers included in integrated circuits is that although the pad drivers are designed with a desired output impedance, an actual output impedance of the pad drivers will change with IC manufacturing process variations, IC power supply variations, signal voltage variations, and temperature variations. Furthermore, while there may be some advantages to packaging the IC's in various different styles of IC packages, difficulties arise in that different styles of IC packages have different characteristic impedances ($Z_0$), resulting in the undesired impedance mis-match and signal reflections in some of the packages. Although an output impedance of the pad driver may be controlled using a transistor impedance, a gate length shrink can change the impedance value. Gate length shrinks are commonly done when IC manufacturing is migrated to a more advanced process having a smaller IC feature size.

Of course, manual adjustment schemes or automated off chip control schemes, for example using scan control, can be employed to correct pad driver impedance of the integrated circuit chips. However such schemes are inconvenient because they require that complex electronic equipment external to the chip be provided and operated.

What is needed is a flexible and efficient integrated circuit chip that includes pad drivers for driving an impedance of a transmission line, wherein the integrated circuit further includes all additional circuitry to automatically adjust a matching impedance of the pad drivers.

SUMMARY OF THE INVENTION

The present invention provides a flexible and efficient integrated circuit chip that includes pad drivers for driving an impedance of a transmission line, wherein the integrated circuit further includes all additional circuitry to automatically adjust a matching impedance of the pad drivers. Since the adjustment is totally on chip, no manual intervention, external instrumentation or external control is required.

Briefly and in general terms, the integrated circuit chip of the present invention includes a set of selectively activatable pad drivers, each pad driver having a respective low activated impedance and a respective high inactivated impedance. The pad drivers are arranged in parallel so as to provide a parallel impedance for electrical coupling to the impedance of transmission line. Accordingly, it should be understood that activated members of the set of pad drivers each have a respective low impedance that add together in a parallel, while the high impedance of the in-activated remaining members of the set of pad drivers do not substantially contribute to the parallel impedance.

The integrated circuit chip of the invention further includes a counter coupled with the drivers for selectively activating an initial number of members of the set of the pad drivers to drive the transmission line with a test pulse. The integrated circuit chip further includes a comparator. A first input of the comparator is coupled with the drivers and the transmission line for sensing a voltage amplitude of the test pulse. A second input of the comparator is coupled with a voltage reference for comparing the voltage amplitude of the test pulse with the reference voltage. An output of the comparator is coupled with the counter for increasing the counter's initial number of selected members of the set of the pad drivers if the voltage amplitude of the test pulse is less than the reference voltage, and for decreasing the counter's initial number of selected members of the set of pad drivers if the voltage amplitude of the test pulse is greater than the reference voltage. Such iterative capabilities of the invention provide an automatic optimal selection of the pad drivers, so that the parallel impedance of the activated drivers provides a good match with the impedance of the transmission line.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1A:
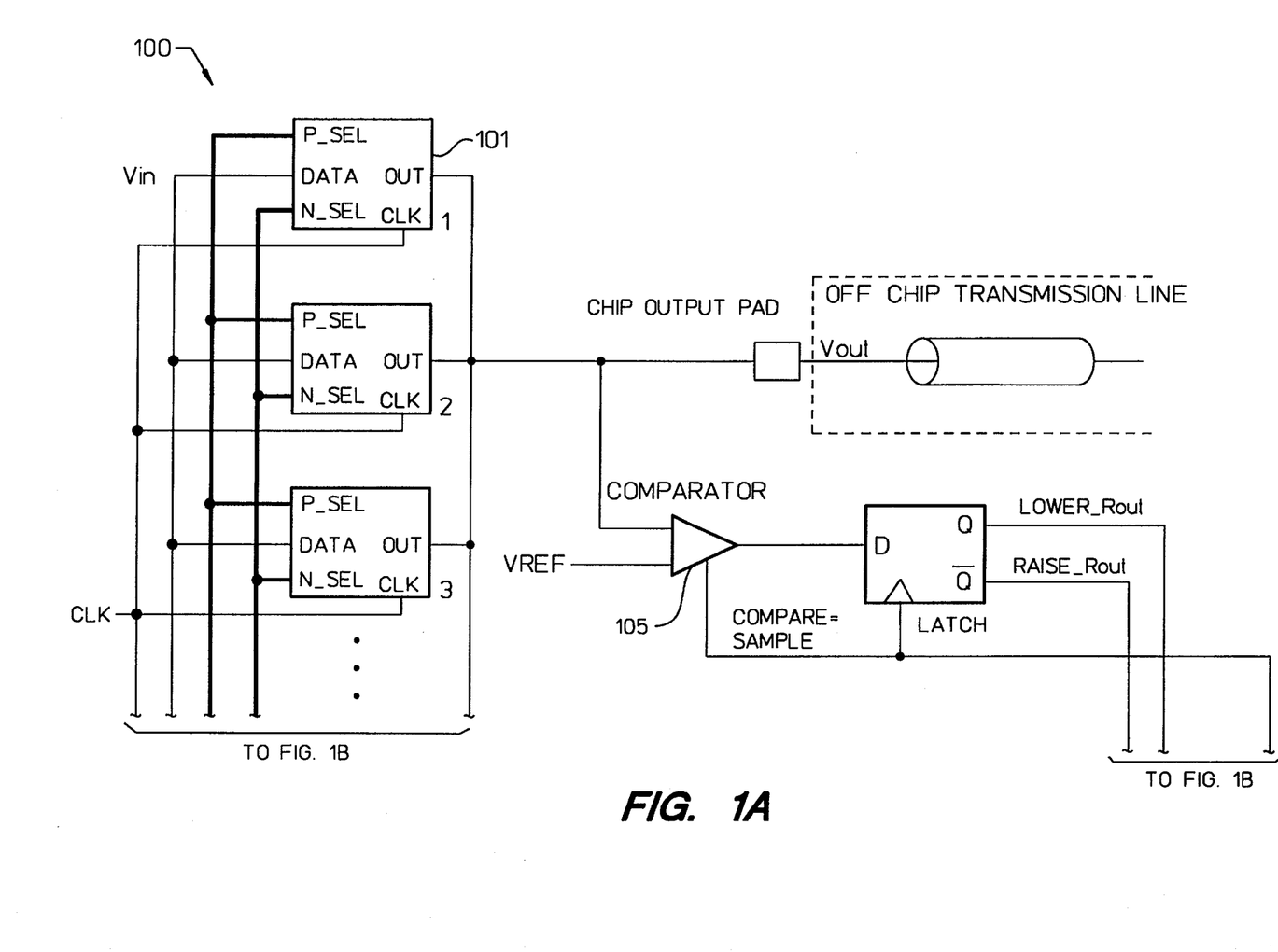
FIG. 1A and 1B are a partial circuit block diagram of the integrated circuit chip of the preferred embodiment of the invention.
Figure 1B:
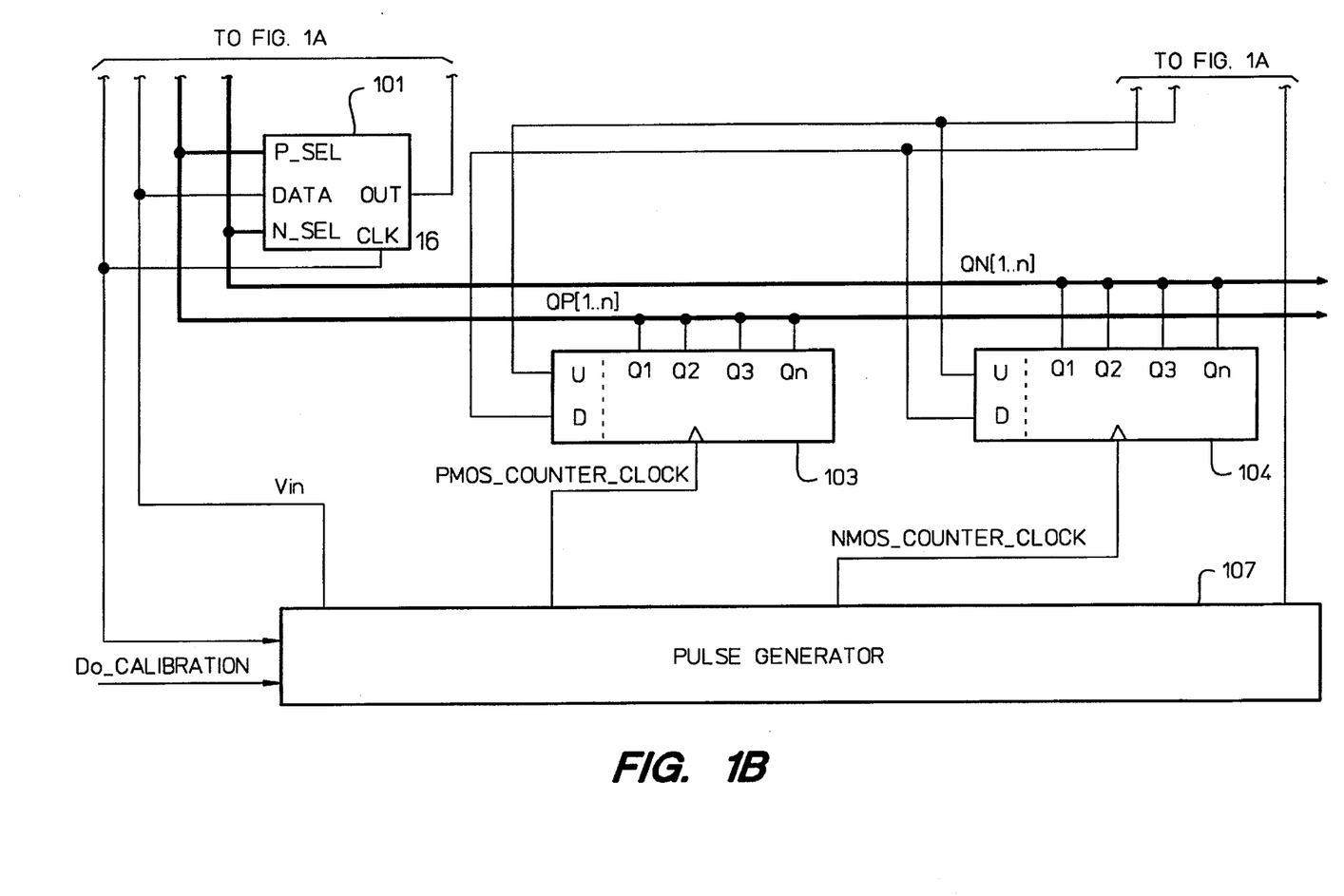

FIGS. 1A and 1B are a partial circuit block diagram of the integrated circuit chip 100 of the preferred embodiment of the invention. As shown in FIGS. 1A and 1B the integrated circuit chip includes a set of selectively activatable pad drivers 101. Each pad driver has a respective low activated impedance and a respective high inactivated impedance. For example, in the preferred embodiment, the activated impedance of each driver is low, on the order of tens or hundreds of ohms, and the inactivated impedance of each driver is high, much greater than a hundred kilo-ohms. Accordingly, in analyzing operation of the invention, the high inactivated impedance of each driver is modeled as an infinite impedance.

As shown in FIGS. 1A and 1B outputs of the pad drivers 101 are arranged in parallel so as to provide a parallel impedance for electrical coupling to the impedance of an off-chip transmission line. Accordingly, it should be understood that activated members of the set of pad drivers each have respective low activated impedance that add together in a parallel, while the high impedance of the in-activated remaining members of the set of pad drivers are modeled as infinite impedances that do not substantially contribute to the parallel impedance.

In the preferred embodiment, each pad driver includes a respective output pull up transistor having a low activated impedance, and a respective output pull down transistor having a low activated impedance. In the preferred embodiment, the output pull up transistor is made in P type Metal Oxide Semiconductor (P-MOS) technology, while the output pull down transistor is made in N type Metal Oxide Semiconductor (N-MOS) technology. The low activated impedance of the driver is substantially determined by the impedances of these output transistors The impedance of each transistor is determined by a ratio of respective width and length dimensions designed for each transistor. For each pad driver segment the P-MOS and N-MOS transistors are designed to have approximately the same impedance. The preferred embodiment provides for sufficient separate impedance adjustment to allow for some impedance differences between the N-MOS transistor and the P-MOS transistor of each pad driver.

As will be discussed in further detail subsequently herein, in the preferred embodiment, the P-MOS impedance values of the parallel coupled outputs of the drivers are indirectly monitored by monitoring voltage amplitude of a rising edge of a test pulse reduced by the P-MOS transistors' impedance mis-match with the transmission line at the driver/transmission line interface. Similarly, the N-MOS impedance values of the parallel coupled outputs of the drivers are indirectly monitored by monitoring voltage amplitude of a falling edge of the test pulse reduced by N-MOS transistors' impedance mis-match with the transmission line at the driver/transmission line interface. To provide an enhanced impedance adjustment range, the impedance of the output P-MOS and N-MOS transistors of the set of drivers gradually increases as from the lowest impedance segment of the set to the highest impedance segment of the set.

Granularity of the impedance steps determines the allowable impedance mismatch to the characteristic impedance ($Z_0$) of the transmission line and determines the expected maximum amount of overshoot and undershoot response at the transmission line output. The number of members of the set of parallel pad drivers and the impedance of each one is determine by the size of impedance adjustment changes desired. In the preferred embodiment, the set of pad drivers includes sixteen members, although for the sake of simplicity fewer than sixteen pad drivers are shown in the figures.

The integrated circuit chip of the invention further includes a first up/down counter 103 coupled with the drivers for selectively activating P-MOS pull up transistors of an initial number of members of the set of the pad drivers to drive the transmission line with a rising edge of a momentary test pulse, Vout, as shown in FIGS. 1A and 1B. Similarly, the integrated circuit chip of the invention further includes a second up/down counter 104 coupled with the drivers for selectively activating N-MOS pull down transistors of another initial number of members of the set of the pad drivers to drive the transmission line with a falling edge of the momentary test pulse, Vout, as shown in FIGS. 1A and 1B. The off-chip transmission line of the printed circuit board (PCB) or multi-chip module (MCM) is driven and the test pulse which momentarily exists at the transmission line input is compared to a reference voltage, which will typically be Vdd/2. This momentary test pulse is due to the voltage divider action of the output impedance of the pad driver and the characteristic impedance of the transmission line.

The integrated circuit chip further includes a comparator 105. As shown in FIGS. 1A, a first input of the comparator is coupled with the drivers and the transmission line for sensing a voltage amplitude of the test pulse. A second input of the comparator is coupled with a voltage reference for comparing the voltage amplitude of the; test pulse with the reference voltage.

One comparator and latch can be used to detect the impedance of the pull up transistor and pull-down transistor in the pad driver circuit. As shown in FIGS. 1A and 1B, an output of the comparator is latched while it is valid and is coupled with the first counter 103 for incrementing the counter to increase the initial number P-MOS pull up transistors of selected members of the set of the pad drivers if the voltage amplitude of the test pulse is less than the reference voltage, and for decrementing the counter to decrease the initial number of selected members of the set of pad drivers if the voltage amplitude of the test pulse is greater than the reference voltage. Accordingly it should be understood that the up/down counter is clocked and advances either up one state or down one state.

Similarly, the output of the comparator is again latched while it is valid and is coupled with the second counter 104 for incrementing the counter to increase the other initial number N-MOS pull down transistors of selected members of the set of the pad drivers if the voltage amplitude of the test pulse is less than the reference voltage, and for decrementing the counter to decrease the initial number of selected members of the set of pad drivers if the voltage amplitude of the test pulse is greater than the reference voltage. The state of the counter is decoded and determines the modified number of pad driver stages that should be activated. The iterative capabilities of the invention provide an automatic optimal selection of the pad drivers, so that the parallel impedance of the activated drivers provides a good match with the impedance of the transmission line.

The bit pattern of the counter, decoded or encoded, is sent also to all pad drivers of the chip that drive transmission lines. Accordingly, it should be understood that although for the sake of simplicity the partial schematic diagram of FIGS. 1A and 1B show just one set of pad drivers for calibration to just one transmission line, the teachings of the invention are generally applicable. For example, in the preferred embodiment, one set of drivers is used for calibration, while the counter outputs are coupled to other pad drivers, not shown in the figures, which are used for actual data transmission.

The impedance adjustment would typically be done at time intervals which are long compared to computer operating speeds. Data at the chip pad drivers would be stopped from being sent off the chip during the calibration. This way the calibration operation will not effect the data being sent out. Since the intervals between the calibration operations are long there would be insignificant effect on system performance. The number of Vin edges (clock cycles) applied needs to equal the number of different impedance values available. Enough counter clock pulses must be applied so all states of counter could be used. This assures that the best matching impedance value is found. For rising edge sensing, 16 positive edges of Vin should be applied. For falling edge sensing, 16 negative edges of Vin should be applied. This assumes a non-inverting pad driver circuit is used.

In the preferred embodiment, the each of the counters has 4 bits to provide $2^4=16$ states. Accordingly, in the preferred embodiment there are sixteen discreet values of parallel summed impedances for the set of pad drivers. For the sake of explanation herein, Rt1 is designated as the largest total parallel summed impedance value desired from the set of pad drivers and it's corresponding conductance is designated as Gt1. A first member of the set of pad drivers that is activated has a conductance, G1. The largest parallel impedance for the set of drivers is achieved by activating only one member of the set of pad drivers, for example the first member. Expressed mathematically:

$$1/Rt1 = Gt1 = G1$$

Rt2 is designated as the second largest total parallel summed impedance value desired from the set of pad drivers and it's corresponding conductance is designated as Gt2. A second member of the set of pad drivers that is activated has a conductance, G2. The second largest parallel impedance for the set of drivers is achieved by activating only two members of the set of pad drivers, for example the first and second members. Expressed mathematically:

$$1/Rt2 = Gt2 = G1 + G2$$

Accordingly, a third largest parallel impedance, RT3, as well as fourth largest parallel impedance, RT4, and so on to the sixteenth largest parallel impedance, RT16, are achieved by additionally activating a third member of the set of drivers having a conductance G3, and so on, to activating a sixteenth member of the set of drivers having a conductance G16, as summarized in the following equations:

$$1/Rt1 = Gt1 = G1$$
$$1/Rt2 = Gt2 = G1 + G2$$
$$1/Rt3 = Gt3 = G1 + G2 + G3$$
$$1/Rt4 = Gt4 = G1 + G2 + G3 + G4$$
$$1/Rt5 = Gt5 = G1 + G2 + G3 + G4 + G5$$
$$1/Rt6 = Gt6 = G1 + G2 + G3 + G4 + G5 + G6$$
$$1/Rt7 = Gt7 = G1 + G2 + G3 + G4 + G5 + G6 + G7$$
$$1/Rt8 = Gt8 = G1 + G2 + G3 + G4 + G5 + G6 + G7 + G8$$
$$1/Rt9 = Gt9 = G1 + G2 + G3 + G4 + G5 + G6 + G7 + G8 + G9$$
$$1/Rt10 = Gt10 = G1 + G2 + G3 + G4 + G5 + G6 + G7 + G8 + G9 + G10$$
$$1/Rt11 = Gt11 = G1 + G2 + G3 + G4 + G5 + G6 + G7 + G8 + G9 + G10 + G11$$
$$1/Rt12 = Gt12 = G1 + G2 + G3 + G4 + G5 + G6 + G7 + G8 + G9 + G10 + G11 + G12$$
$$1/Rt13 = Gt13 = G1 + G2 + G3 + G4 + G5 + G6 + G7 + G8 + G9 + G10 + G11 + G12 + G13$$
$$1/Rt14 = Gt14 = G1 + G2 + G3 + G4 + G5 + G6 + G7 + G8 + G9 + G10 + G11 + G12 + G13 + G14$$
$$1/Rt15 = Gt15 = G1 + G2 + G3 + G4 + G5 + G6 + G7 + G8 + G9 + G10 + G11 + G12 + G13 + G14 + G15$$
$$1/Rt16 = Gt16 = G1 + G2 + G3 + G4 + G5 + G6 + G7 + G8 + G9 + G10 + G11 + G12 + G13 + G14 + G15 + G16$$

A respective counter bit pattern corresponds each of these parallel impedances. The initial number of activated members of the set of pad drivers corresponds to the counter initial state, and also correspond to a nominal expected value for the characteristic impedance, $Z_0$, of the transmission line. Preferably, this one of the middle values of the parallel impedances, such as Rt8 or Rt9. A preferred counter bit pattern corresponding the each of the impedances is shown below:

Counter bit pattern $1/Rt1 = Gt1 \rightarrow (0000)$
$1/Rt2 = Gt2 \rightarrow (0001)$
$1/Rt3 = Gt3 \rightarrow (0010)$
$1/Rt4 = Gt4 \rightarrow (0011)$
$1/Rt5 = Gt5 \rightarrow (0100)$
$1/Rt6 = Gt6 \rightarrow (0101)$
$1/Rt7 = Gt7 \rightarrow (0110)$
$1/Rt8 = Gt8 \rightarrow (0111)$
$1/Rt9 = Gt9 \rightarrow (1000)$ initial state
$1/Rt10 = Gt10 \rightarrow (1001)$
$1/Rt11 = Gt11 \rightarrow (1010)$
$1/Rt12 = Gt12 \rightarrow (1011)$
$1/Rt13 = Gt13 \rightarrow (1100)$
$1/Rt14 = Gt14 \rightarrow (1101)$
$1/Rt15 = Gt15 \rightarrow (1110)$
$1/Rt16 = Gt16 \rightarrow (1111)$ Assuming a 4 bit counter, the state of the counter can be decoded globally for example at the counter and 16 lines are then routed to the 16 pad driver stages shown in FIGS. 1A and 1B. Alternatively the counter bits can be decoded locally at each pad driver state. The design tradeoffs are that for global decoding space for 16 lines must be allocated. These lines go the calibrating pad driver and all the real pad drivers that drive transmission lines. However, each of the sixteen pad drivers are advantageously smaller since no decode gating is needed. Alternatively, for local decoding, space for only 4 lines, QP(1 . . . n), is needed, however, decode gating must be placed in each pad driver segment.

As shown in FIG. 1B, the integrated circuit chip of the invention further includes a pulse generator 107. The pulse generator contains a number of pulse generation circuits which are triggered by the "Do_Calibration" signal and clock signal, CLK. The CLK signal maybe the overall chip system clock or a special clock for this function. The pulses provided by the generator are a data signal, Vin; a sampling signal, Sample; a signal for stepping the first counter when it's up/down inputs are valid, P-MOS_COUNTER_CLOCK; and a signal for stepping the second counter when it's up/down inputs are valid, N-MOS_COUNTER_CLOCK.

Figure 2:
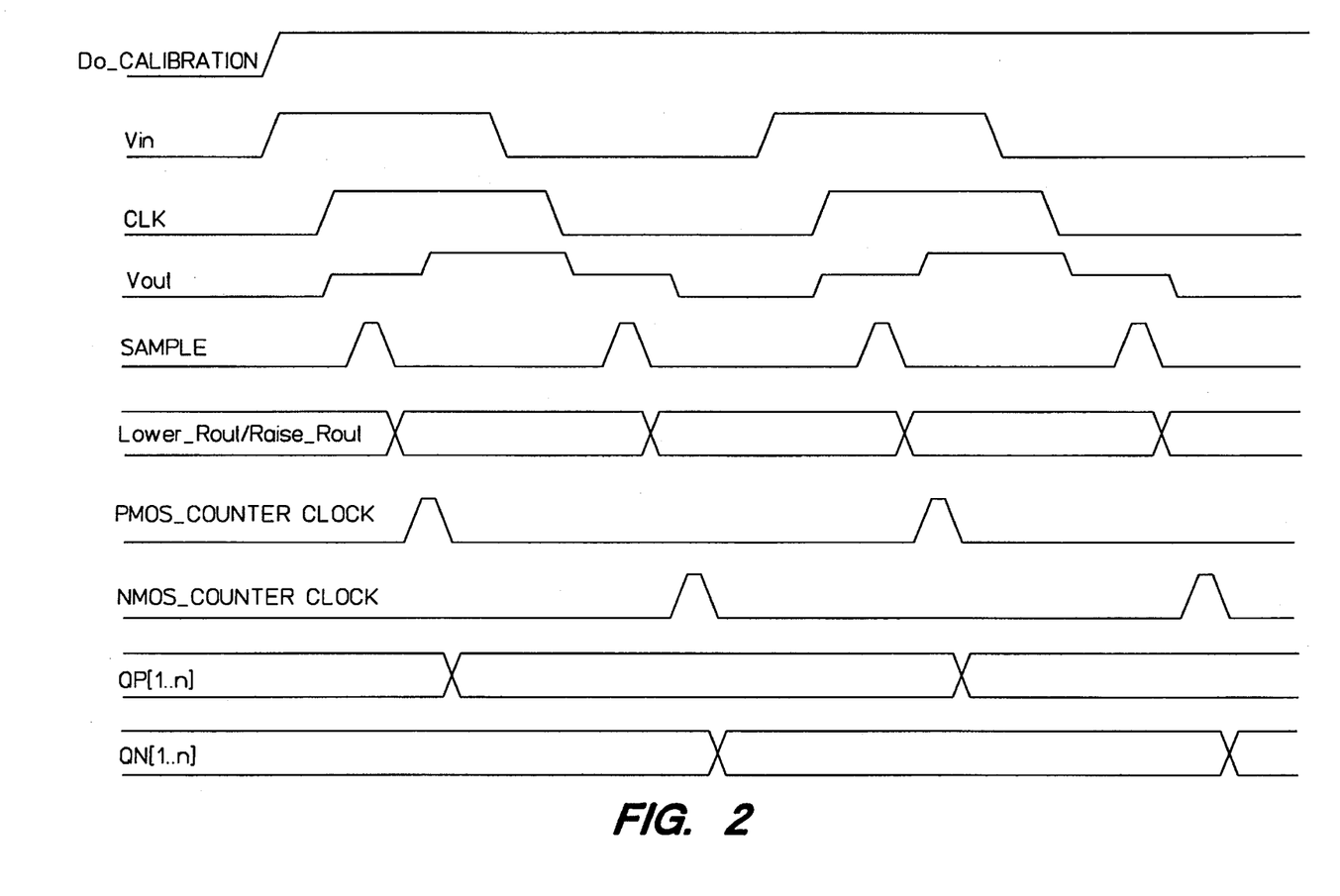
FIG. 2 shows a timing diagram illustrating operation of the preferred embodiment shown in FIGS. 1A and 1B.

FIG. 2 is a timing diagram of these signals, along with the test pulse, Vout, and the counter decode signals QP(1 . . . n), illustrating operation of the preferred embodiment shown in FIGS. 1A and 1B. FIG. 2 particularly shows voltage amplitude reduction of a rising and falling edges of the test pulse, Vout. As illustrated in the diagram of FIG. 2, the pad driver is designed to send data out of the chip on each edge of the clock, both rising and falling, in a "double pumped mode", as an alternative to a more conventional mode, referred to as single pumped, of sending out data on either only the rising or falling edge of the clock. This invention operates with either single double pumped output pad drivers.

Figure 3:
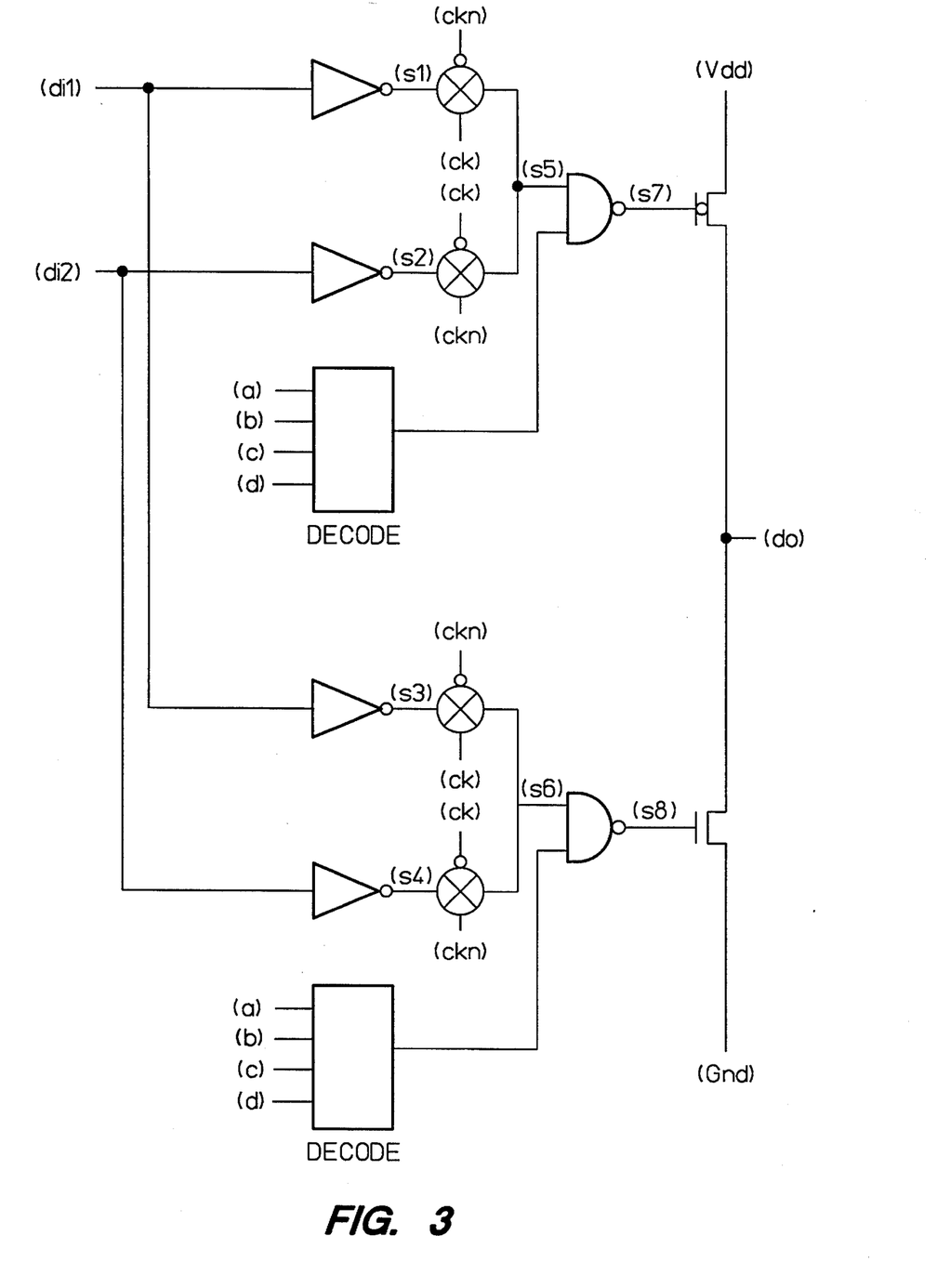
FIG. 3 shows a detailed schematic diagram of one of the pad drivers shown in FIGS. 1A and 1B.

FIG. 3 shows a detailed schematic diagram of one of the pad drivers shown in FIG. 1, which features the four bit decode gating. This is a double pumped pad driver. The signals (di1) and (di2) are the two signals to be driven out of the chip. Signal (di1) propagates to the output when (ck) goes high and signal (di2) propagates to the output when (ckn) goes high. The signals a, b, c, d are the bit pattern from the counter. This schematic of FIG. 3 shows local decoding at each pad driver segment and independent control of P-MOS and N-MOS transistors. The decoding is done in the blocks labeled "DECODE".

If global decoding is used the decoded signal goes directly into nand s7 and into nor s8. For the rising edge sensing, the decode block driving nand s7 is present and the decode block driving nor s8 is deleted. The output of the decode block driving nand s7 is inverted and drives nor s8. For the falling edge sensing, the decode block driving nor s8 is present and the decode block driving nand s7 is deleted. The output of the decode block driving nor s8 is inverted and drives nand S7.

Figure 4A:
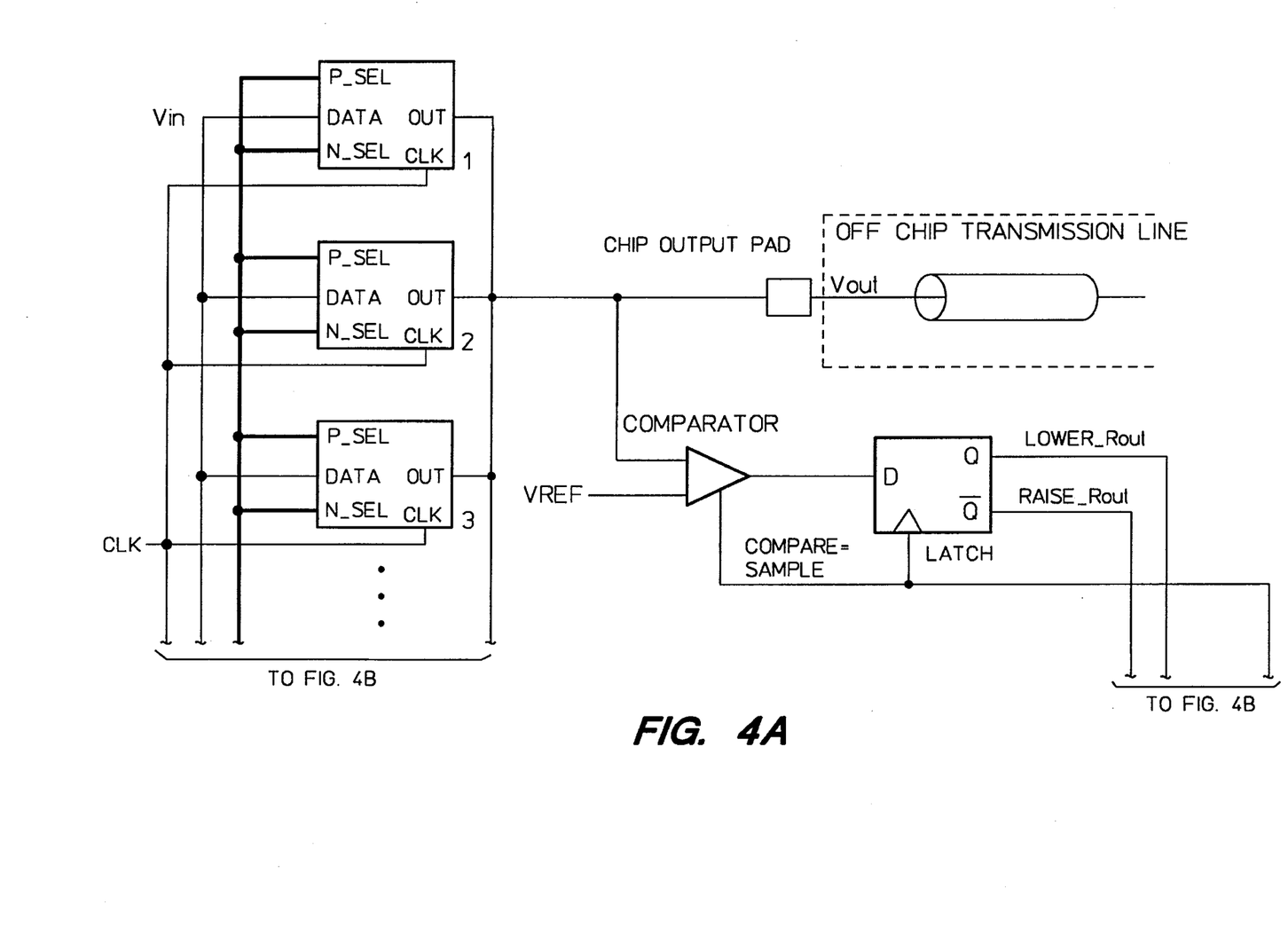
FIGS. 4A and 4B are a partial circuit block diagram of an alternative embodiment of the invention.
Figure 4B:
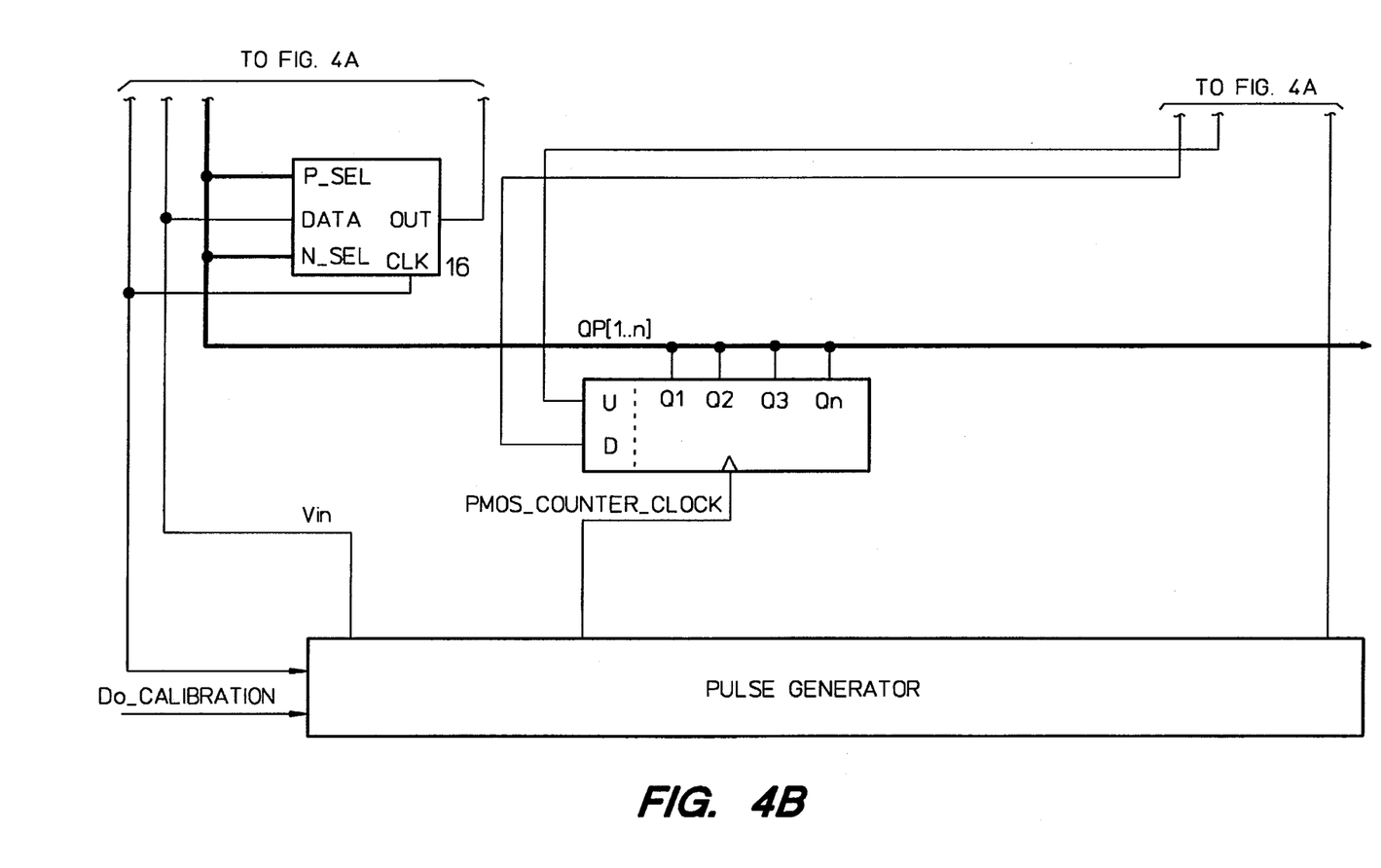

FIGS. 4A and 4B are a partial circuit block diagram of an alternative embodiment of the invention, wherein independent impedance control of only P-MOS transistors requires only one counter in comparison to the two counters discussed in detail previously with respect to the preferred embodiment shown in FIGS. 1A and 1B. Accordingly, since the N-MOS transistor impedance will substantially track the P-MOS transistor impedance, a needed adjustment to the parallel impedances of the activated P-MOS transistors also suggests a needed adjustment to the parallel impedances of the activated N-MOS transistors.

Figure 5:
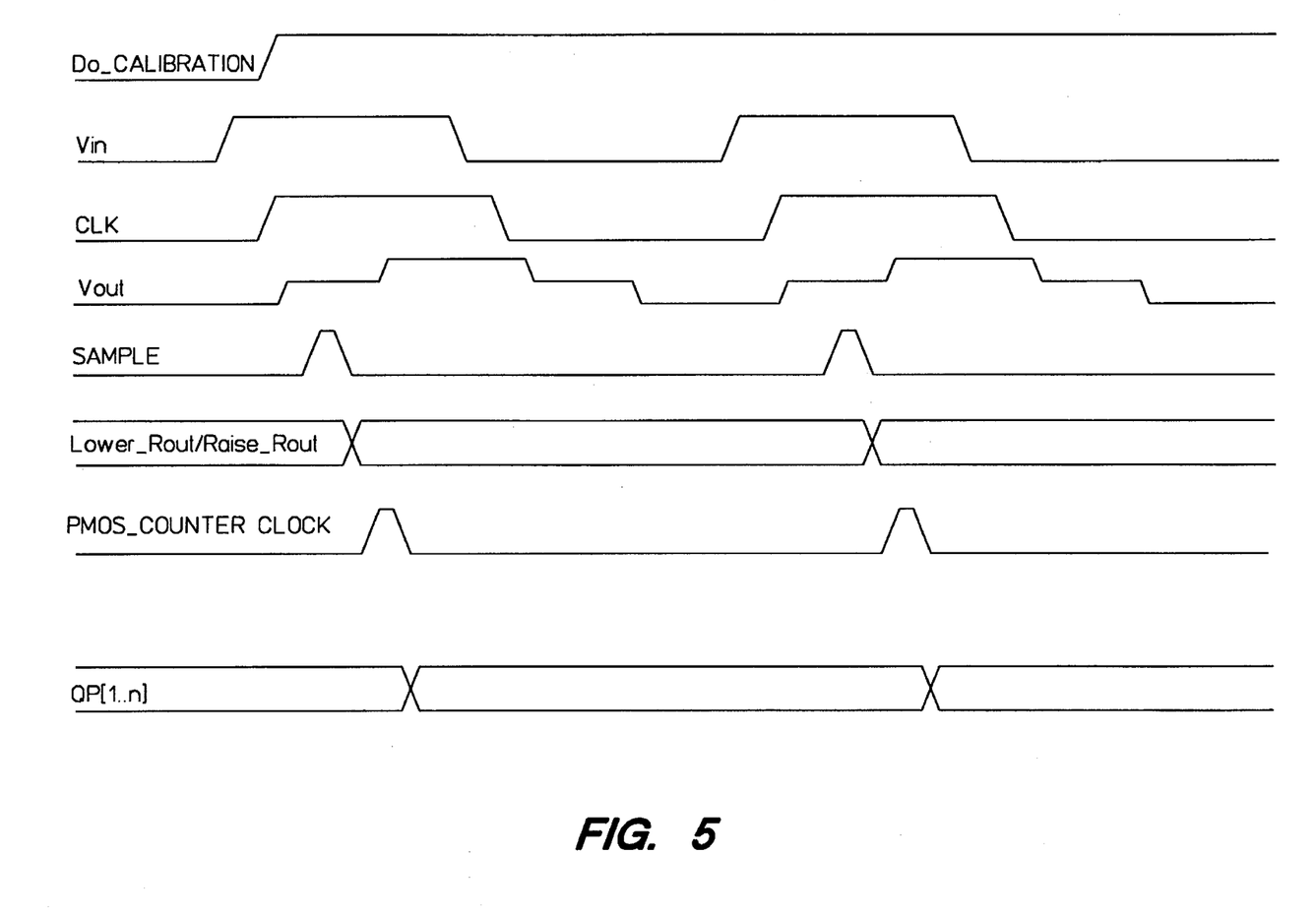
FIG. 5 is a timing diagram illustrating operation of the embodiment shown in FIGS. 4A and 4B.

As shown in FIGS. 4A and 4B, in this alternative embodiment, there half as many control lines from the counters to the pad drivers. Although the embodiment in FIGS. 1A and 1B are more complex than that shown in FIGS. 4A and 4B, the embodiment of FIGS. 1A and 1B are preferred because it provides an advantage in that there is no requirement for the impedance of the P-MOS transistor to track the impedance of the N-MOS transistor. FIG. 5 is a timing diagram illustrating operation of the embodiment shown in FIGS. 4A and 4B.

Figure 6:
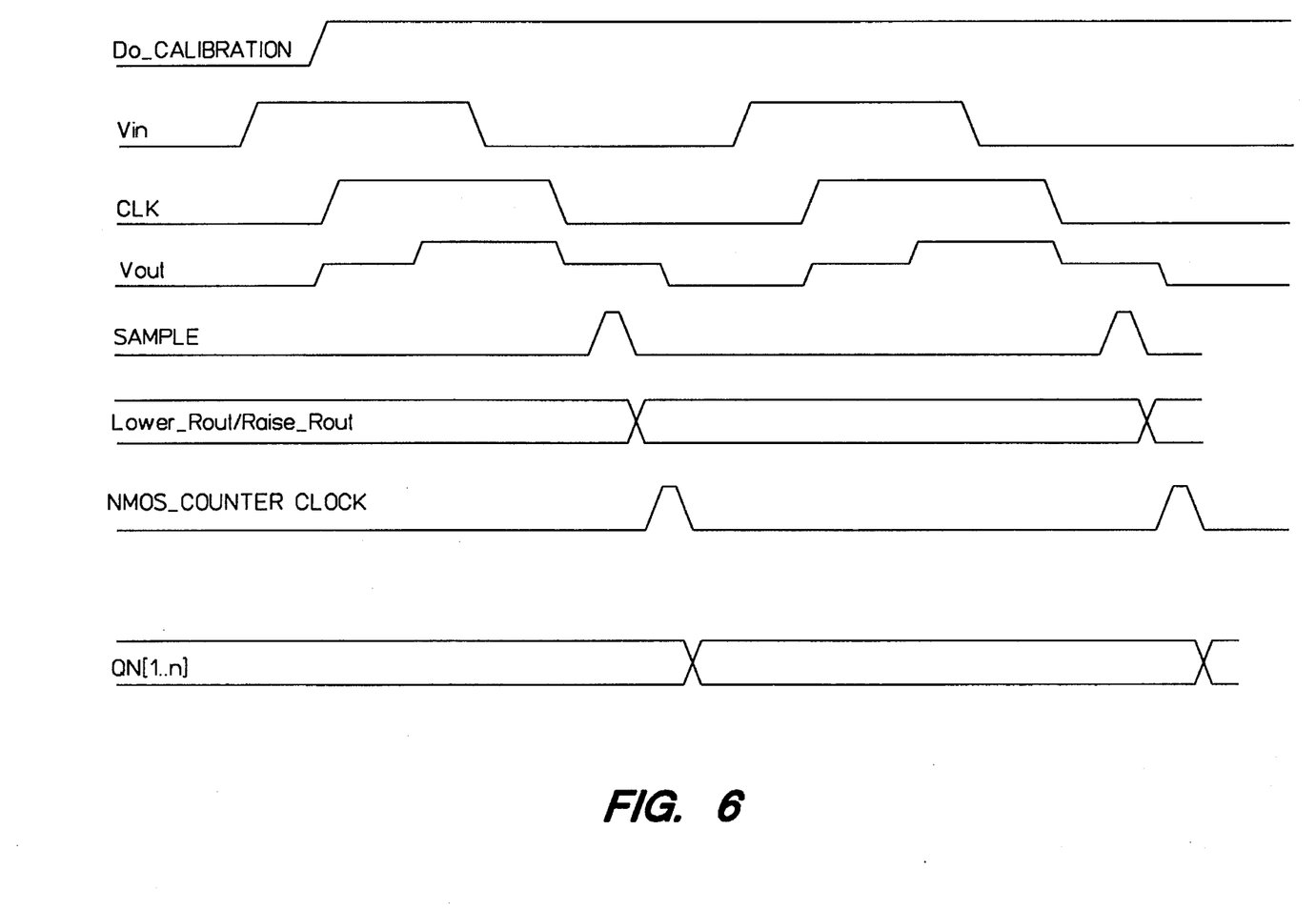
FIG. 6 is a timing diagram illustrating operation of yet another alternative embodiment of the invention.

FIG. 6 is a timing diagram illustrating operation of an alternative embodiment of the invention, generally similar to the embodiment of FIGS. 4A and 4B except that falling edge sensing is used instead of the rising edge sensing. Accordingly the timing diagram in FIG. 6 shows the N-MOS__COUNTER__CLOCK, instead of the P-MOS__COUNTER__CLOCK, as in the timing diagram of FIG. 5.

The present invention provides a flexible and efficient integrated circuit chip that includes pad drivers for driving an impedance of a transmission line, wherein the integrated circuit further includes all additional circuitry to automatically adjust a matching impedance of the pad drivers. Although specific embodiments of the invention have been described and illustrated, the invention is not to be limited to the specific forms or arrangements of parts so described and illustrate, and various modifications and changes can be made without departing from the scope and spirit of the invention. Within the scope of the appended claims, therefore, the invention may be practiced otherwise than as specifically described and illustrated.

What is claimed is:

1. An apparatus for driving a transmission line having an impedance comprising:

an integrated circuit chip including:
a set of selectively activatable pad drivers, each pad driver having a respective low activated impedance and a respective high inactivated impedance, the pad drivers being arranged in parallel so as to provide a parallel impedance for electrical coupling to the impedance of transmission line;
a counter coupled with the drivers for selectively activating an initial number of members of the set of the pad drivers to drive the transmission line with a test pulse;
a comparator having a first and second input and an output, the first input of the comparator being coupled with the drivers and the transmission line for sensing a voltage amplitude of the test pulse, the second input of the comparator being coupled with a reference voltage for comparing the voltage amplitude of the test pulse with the reference voltage, the output of the comparator being coupled with the counter for increasing the counter's initial number of selected members of the set of the pad drivers if the voltage amplitude of the test pulse is less than the reference voltage, and for decreasing the counter's initial number of selected members of the set of pad drivers if the voltage amplitude of the test pulse is greater than the reference voltage.

2. An apparatus as in claim 1 wherein each pad driver includes a respective output pull up transistor having a low activated impedance, and a respective output pull down transistor having a low activated impedance, wherein the low activated impedance of the driver is substantially determined by the impedances of these output transistors.

3. An apparatus as in claim 2 wherein the output pull up transistor is made in P-MOS technology, while the output pull down transistor is made in N-MOS technology.

4. An apparatus as in claim 2 wherein:

the counter is coupled with the pull up transistor for selectively activating the pull up transistor to drive the transmission line with a rising edge of the test pulse;

the apparatus further comprises another counter; and said another counter is coupled with the pull down transistor for selectively activating the pull down transistor to drive the transmission line with a falling edge of the test pulse.

5. A method for driving a transmission line having an impedance comprising the steps of:

providing an integrated circuit chip having a counter, a comparator, and a set of selectively activatable pad drivers, each pad driver having a respective low activated impedance and a respective high inactivated impedance, the pad drivers being arranged in parallel for electrical coupling with the transmission line; and using the counter to selectively activate members of the set of pad drivers so that the respective low impedance of each activated member add together in a parallel impedance that substantially matches the impedance of the transmission line, while the high impedance of the inactivated members do not substantially contribute to the parallel impedance.

6. A method as in claim 5 wherein the step of selectively activating members of the set of pad drivers includes:

using the counter to select an initial number of the members of the set of the pad drivers;

activating the selected members of the set of pad drivers to drive the transmission line with a test pulse;

using the comparator to sense a voltage amplitude of the test pulse;

using the comparator to compare the voltage amplitude of the test pulse with a reference voltage;

increasing the counter's initial number of selected members of the set of the pad drivers if the voltage amplitude of the test pulse is less than the reference voltage; and decreasing the counter's initial number of selected members of the set of pad drivers if the voltage amplitude of the test pulse is greater than the reference voltage.

* * * * *